United States Patent [19]

Akami et al.

[11] Patent Number: 5,150,148
[45] Date of Patent: Sep. 22, 1992

[54] CAMERA WITH IMPROVED ABILITY TO PHOTOGRAPH MOVING OBJECTS

[75] Inventors: Noboru Akami, Yokohama; Daiki Tsukahara, Hiratsuka, both of Japan

[73] Assignee: Nikon Corporation, Tokyo, Japan

[21] Appl. No.: 580,181

[22] Filed: Sep. 10, 1990

[30] Foreign Application Priority Data

Sep. 14, 1989 [JP] Japan .............................. 1-107222[U]

[51] Int. Cl.$^5$ ............................ G03B 7/00; G03B 7/08
[52] U.S. Cl. ...................................... 354/413; 354/430
[58] Field of Search ................. 354/422, 423, 430, 420

[56] References Cited

U.S. PATENT DOCUMENTS

| | | | |
|---|---|---|---|
| 3,399,307 | 8/1968 | Levin | 354/430 |
| 4,218,119 | 8/1980 | Schickedanz | 354/430 |
| 4,320,948 | 3/1982 | Hosoe et al. | 354/430 |
| 4,783,677 | 11/1988 | Hamada et al. | 354/430 X |
| 4,980,715 | 12/1990 | Utagawa | 354/402 |

FOREIGN PATENT DOCUMENTS 60-214325 10/1985 Japan .

*Primary Examiner*—L. T. Hix
*Assistant Examiner*—J. K. Han
*Attorney, Agent, or Firm*—Shapiro and Shapiro

[57] ABSTRACT

An auto-focus camera with compensation for object movement along the optic axis of the photo-taking lens determines whether the object speed is greater than a predetermined value. If the result of the determination is negative, normal photography is performed in which a combination of shutter speed and aperture diameter provides a proper exposure in accordance with photometric data. If the result of the determination is affirmative, the aperture is stopped down to a predetermined diameter small enough to provide a large depth of field, and flash photography is performed.

4 Claims, 2 Drawing Sheets

CAMERA WITH IMPROVED ABILITY TO PHOTOGRAPH MOVING OBJECTS

BACKGROUND OF THE INVENTION

This invention relates to a camera, particularly of the auto-focus type, having improved ability to photograph moving objects.

Auto-focus cameras are known in which the usual driving of a photo-taking lens (or a portion thereof) to achieve focusing is modified to compensate for movement of an object along the optic axis of the photo-taking lens. See, for example, U.S. Pat. No. 4,783,677 (incorporated herein by reference) and Japanese Patent Application Laid-Open No. 60-214325. Co-pending application Ser. No. 489,740, filed Feb. 28, 1990, now U.S. Pat. No. 4,980,715, issued Dec. 25, 1990, which is a continuation of original application Ser. No. 131,094, filed Dec. 10, 1987 (incorporated herein by reference) discloses an automatic focus adjusting apparatus that is a significant improvement over the prior art regarding ability to obtain in-focus photographs of an object moving along the optic axis of the photo-taking lens. Nevertheless, such photographs may be difficult to obtain if the speed of the object changes unexpectedly or is unusually high.

SUMMARY OF THE INVENTION

The present invention solves the foregoing problem by providing a camera that changes its mode of operation automatically when it is determined that the speed of an object to be photographed exceeds a predetermined value. In response to such a determination, the aperture of the photo-taking lens is stopped down to a predetermined diameter small enough to provide a large depth of field.

BRIEF DESCRIPTION OF THE DRAWINGS

The invention will be further described in conjunction with the accompanying drawings, which illustrate a preferred (best mode) embodiment of the invention, and wherein.

DESCRIPTION OF THE PREFERRED EMBODIMENT

Figure 1:
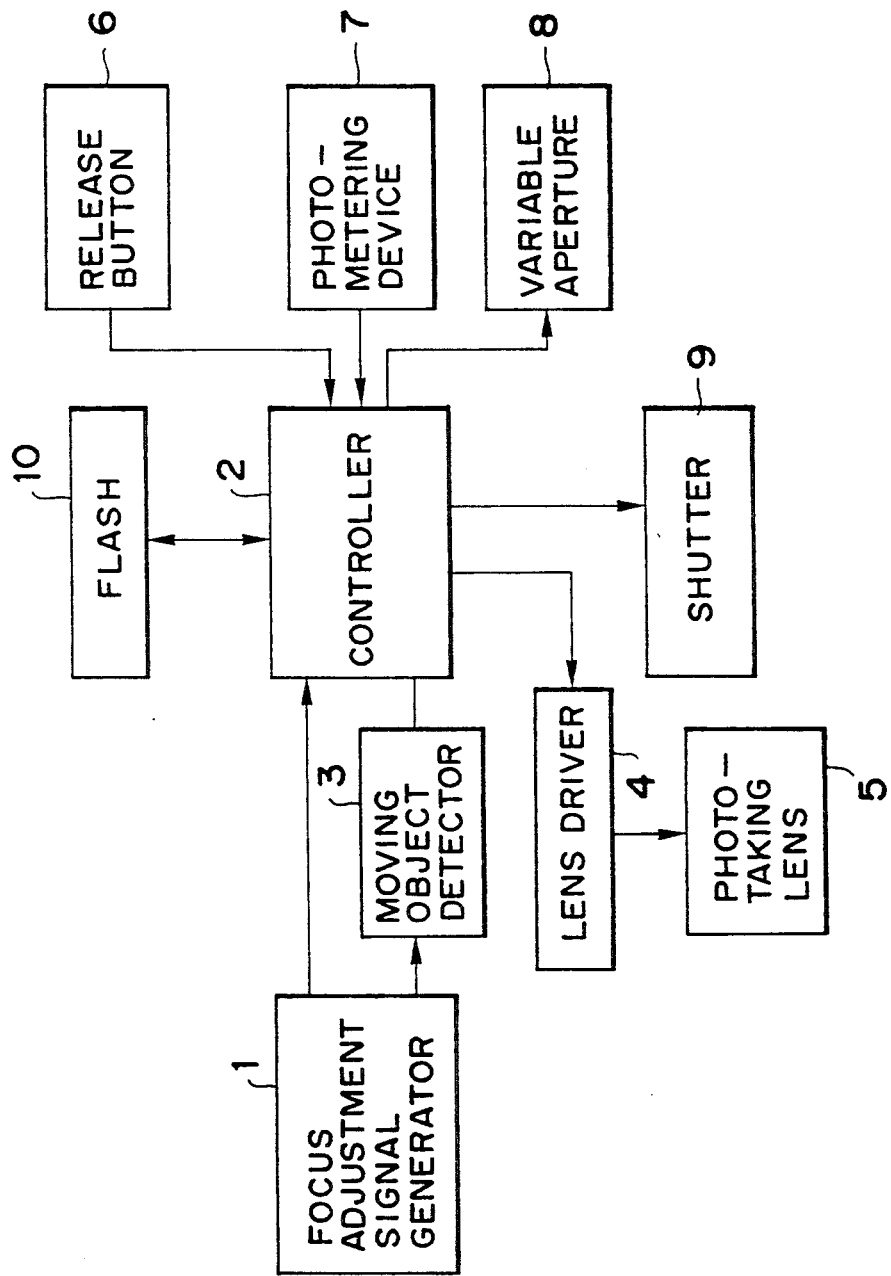
FIG. 1 is a block diagram of a camera incorporating the invention.

In the illustrative embodiment shown in FIG. 1, the invention is incorporated in a camera of the auto-focus type that includes a focus adjustment signal generator 1, a controller 2, a moving object detector 3, a lens driver 4, a photo-taking lens 5, a release button 6, a photometering device 7, a variable aperture 8, a shutter 9, and a flash device 10. In a prior art auto-focus camera having compensation for movement of an object along the optic axis of the photo-taking lens, a controller controls the driving of the photo-taking lens via a lens driver in accordance with the output of a focus adjusting signal generator and the output of a moving object detector. The speed of the moving object and a corresponding amount of lens driving compensation are calculated from variation of defocus amounts at predetermined time intervals. Focus detection and moving object detection are performed in response to half-depression of a release button. In response to full depression of the release button a photographing operation is performed in which a combination of aperture diameter and shutter speed provides a proper exposure in accordance with the output of a photometering device.

Although the prior art camera is designed to drive the photo-taking lens in a manner that compensates for movement of an object along the optic axis, if the speed of the object changes unexpectedly or is too high, it may not be possible to obtain a photograph that is in focus. In accordance with the present invention, the controller 2 determines whether the speed of the object along the optic axis exceeds a predetermined value. If so, instead of the normal photography operation just described, the controller 2 adjusts the aperture 8 to a predetermined diameter small enough to ensure a large depth of field and energizes the flash device 10, so as to provide a proper exposure. If the object is sufficiently bright and when a proper exposure is obtained with an aperture of the lens stopped down (for example, the aperture being stopped down to minimum aperture diameter), the flash device 10 need not be operated.

Figure 2:
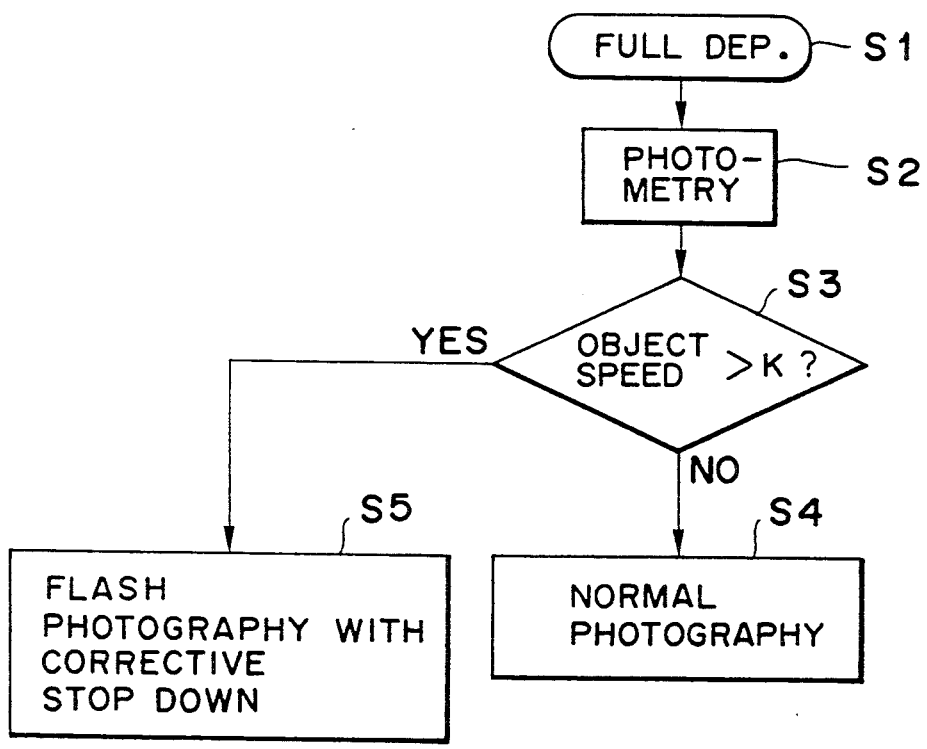
FIG. 2 is a flow chart illustrating a photographing operation of the camera.

The operation of the camera in accordance with the invention is shown in FIG. 2. In response to full depression of the shutter release button 6 (S1), the photometering device 7 performs photometry (S2), and the controller 2 determines whether the object speed is above a predetermined value K (e.g., 0.5 m/sec) (S3). If the result of this determination is negative, normal photography is performed, i.e., the combination of aperture diameter and shutter speed, as controlled by the controller, provides a proper exposure in accordance with the output of the photometering device. For example, if the camera has been set to operate in a shutter speed priority mode, the shutter speed is preset and the controller will adjust the diameter of the aperture to an appropriate value dependent upon the brightness of the object (and film speed, etc.).

If the result of the determination at step S3 is affirmative, a corrective stop down is performed, i.e., the aperture is adjusted to a predetermined diameter (e.g., F11) small enough to provide a large depth of field, and flash photography is performed (S5). The predetermined aperture diameter is independent of the photometric data and selected so as to account for the intensity of the flash emission, the duration of which may be controlled in response to light reflected from the object. The controller may provide some adjustment of the shutter speed (and/or aperture) if illumination of the object by the flash is inadequate for a proper exposure. If the predetermined diameter is small enough to provide a large depth of field and the object is bright enough to provide a proper exposure, the flash device need not be operated (step S5). By virtue of the invention an in-focus photograph can be obtained under conditions in which a prior art camera having moving object compensation is incapable of such performance.

In the foregoing description of the operation of the camera, a description of conventional functions, such as auto-focusing in response to half-depression of the shutter release button, and film advance after exposure, are omitted. Similarly, the mirror up/down operation in a single lens reflex camera and the compensating driving of the photo-taking lens to accommodate object motion along the optic axis have not been described. The compensating driving may occur during the usual auto-focus operation responsive to half-depression of the release button or may occur in response to full-depression of the release button, i.e., separately from the usual auto-focus driving.

While a preferred embodiment of the invention has been shown and described, it will be apparent to those skilled in the art that changes can be made in this embodiment without departing from the principles and spirit of the invention, the scope of which is defined in the appended claims.

We claim:

1. A camera having a photo-taking lens, a shutter, a variable aperture, and a flash device, and comprising:
   (a) means for determining whether an object to be photographed is moving along an optic axis of the photo-taking lens at a speed above a predetermined value;
   (b) means for performing photography with said aperture adjusted to a predetermined diameter dependent upon photometric data when the determined speed of the object does not exceed said predetermined value; and
   (c) means for performing flash photography with said flash device and with said aperture adjusted to a diameter which is smaller than said predetermined diameter when the determined speed of the object exceeds said predetermined value.

2. A camera according to claim 1, wherein said camera includes means for automatic focusing adjustment of the photo-taking lens and means for modifying the adjustment of the photo-taking lens to compensate for movement of the object along the optic axis of the lens.

3. A camera having a photo-taking lens, a shutter, and a variable aperture, and comprising:
   (a) means for determining whether an object to be photographed is moving along an optic axis of the photo-taking lens at a speed above a predetermined value;
   (b) means for performing photography in which a combination of shutter speed and aperture diameter provides an exposure in accordance with photometric data when the determined speed of the object does not exceed said predetermined value; and
   (c) means for performing photography with said aperture adjusted to a diameter which is smaller than said diameter in accordance with said photometric data and with said shutter adjusted to a shutter speed which is slower than said shutter speed in accordance with said photometric data when the determined speed of the object exceeds said predetermined value.

4. A camera having a photo-taking lens, a shutter, and a variable aperture, and comprising:
   (a) means for determining whether an object to be photographed is moving along an optic axis of the photo-taking lens at a speed above a predetermined value;
   (b) means for performing photography in which a combination of shutter speed and aperture diameter provides an exposure in accordance with photometric data when the determined speed of the object does not exceed said predetermined value;
   (c) means for performing photography with said aperture adjusted to a diameter which is smaller than said diameter in accordance with said photometric data and with said shutter adjusted to a shutter speed which is slower than said shutter speed in accordance with said photometric data when the determined speed of the object exceeds said predetermined value;
   (d) means for automatic focusing adjustment of said photo-taking lens; and
   (e) means for modifying the adjustment of said photo-taking lens to compensate for movement of the object along the optical axis of the lens.

* * * * *